L. S. LACHMAN.
PROCESS OF ELECTRIC WELDING
APPLICATION FILED MAR. 25, 1912.

1,038,604.

Patented Sept. 17, 1912.

WITNESSES

INVENTOR
Laurence S. Lachman
BY
Townsend & Decker
ATTORNEYS

UNITED STATES PATENT OFFICE.

LAURENCE S. LACHMAN, OF NEW YORK, N. Y., ASSIGNOR TO UNIVERSAL ELECTRIC WELDING COMPANY, OF LONG ISLAND CITY, NEW YORK, A CORPORATION OF NEW YORK.

PROCESS OF ELECTRIC WELDING.

1,038,604. Specification of Letters Patent. Patented Sept. 17, 1912.

Original application filed May 8, 1907, Serial No. 372,506. Divided and this application filed March 25, 1912. Serial No. 685,954.

*To all whom it may concern:*

Be it known that I, LAURENCE S. LACHMAN, a citizen of the United States, and a resident of New York, in the county of New York and State of New York, have invented certain new and useful Improvements in Processes of Electric Welding, of which the following is a specification.

This invention relates to a method of joining metal plates or bodies edge to edge by the electric welding process.

The object of the invention is to afford a simple and easily performed method of joining metal plates or strips edge to edge without the necessity of specially preparing the parts for the electric welding process such as providing lateral protuberances projecting from the plane of or the flat surface of the material to be joined or the material used as a joining or connecting means. In the electric welding process such protuberances or projections have heretofore been employed in order to localize the current and pressure in small areas of the parts to be joined in order to facilitate and carry out the process.

By practising this invention the metal plates or parts to be joined edge to edge are coupled together by a plurality of comparatively small welding pieces all the parts of which lie in the same plane and which are superimposed on the plates or pieces and make a flat contact therewith. The welding pieces themselves, owing to their comparative size or conformation, make but a limited area of contact with the plates to be joined and are arranged to span or bridge the abutting or opposed edges and are electrically welded to both plates or pieces to be joined at either side of the adjacent edges.

The present process is further advantageous in that by its employment there is not so much bur raised as when the coupling piece is provided with lateral projections and therefore the work, after welding, is left in smoother condition than by the method above referred to.

The invention consists in the methods or processes hereinafter more particularly described with reference to the accompanying drawings and then specified in the claims.

In the accompanying drawings, I show various styles of coupling or welding pieces which may be employed, it being understood that such drawings are for the purpose of illustrating the method in general and for such purpose only specific forms or configuration of welding pieces and pieces to be joined are shown.

Figure 1:
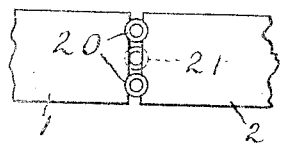
Figure 3:
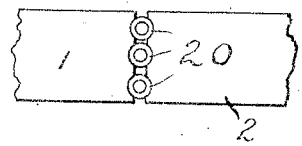
Figure 2:
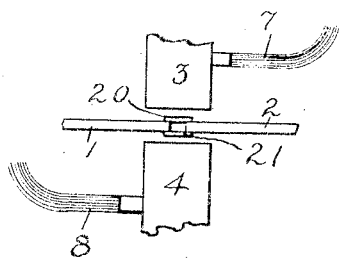
Figure 4:
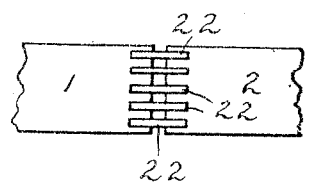
Figure 5:
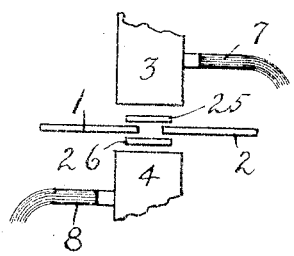

Figure 1 shows a plurality of welding pieces arranged to join or secure an edge to edge union between two plates or pieces of metal, the welding pieces being here shown as rings, alternate rings being disposed on opposite surfaces of the plates. Fig. 2 is an edge view of such arrangement. Fig. 3 shows a similar arrangement with all the welding pieces on one surface of the plates. Fig. 4 shows a similar arrangement with strip-like pieces in lieu of the rings shown in the prior figures. Fig. 5 shows an arrangement of solid welding pieces disposed on opposite surfaces of the plates.

The plates or pieces of metal 1, 2 to be joined edge to edge may be brought together with their edges in any desired proximity or even in contact, in the drawings, for clearness, the edges of the two plates being shown as somewhat separated.

The plates are brought together in the desired relation between current carrying electrodes 3 and 4 and separate welding pieces 20 placed along the opposed edges at any desired distance apart and so disposed as to make flat contact with the surface of both plates near the edge and to span or bridge the juncture of the plates. The welding pieces may if desired be located on but one surface of the work as indicated in Fig. 3, or may be located on both surfaces as indicated in Fig. 1 and in which case the welding pieces on one surface may have a staggered relation to the welding pieces on the other surface or they may be in line with each other as desired. Also the welding pieces may be in the form of rings as shown in Figs. 1 and 3 or they may be solid as indicated at 25 and 26 in Fig. 5.

The welding pieces are of comparatively small size as compared with the pieces to be joined and make but a limited area of contact with each plate near the edge, the area of contact being further limited or restricted by making the contour or edges of the welding pieces curved or circular.

For the sake of clearness the welding pieces and the electrodes 3, 4 in Figs. 2 and 5 are shown as separated and in Fig. 5 the welding pieces are shown as separated from the plates 1 and 2, but in practice and during the welding operation it will be understood that the welding pieces are in surface contact with the plates to be joined and the electrodes are engaged with the welding pieces. It will also be understood that the electrodes 3, 4 are supplied with heating current of suitable volume for the electric welding operation by the conductors 7, 8 connected thereto and that associated with them are proper means for applying a suitable welding pressure.

The welding operation, it is thought, will be readily understood. Current passing from one electrode to the other heats and softens the welding pieces and the metal of the plates over the area of contact and the application of pressure to the heated parts by causing the electrodes to move one toward the other completes the welding operation by causing the metal of the welding pieces to coalesce with the metal of the plates at the points of contact, the welding pieces alone being relied upon to produce the union between the plates.

A number of the welding pieces may be welded to the plates at one operation or each piece may be separately welded to the plates whereby each point of joining is independently effected.

In Fig. 4 the plates are shown as joined by a plurality of straight strips 22: the strips being comparatively thin form but a restricted area of contact with the plates.

This application constitutes a division of my application filed May 8, 1907, Serial Number 372,506.

The invention claimed is:

1. The method of joining metal plates or pieces edge to edge by their plane surfaces consisting in superposing on said plates a plurality of welding pieces along the line of proposed union and bridging the adjacent edges of the plates, passing an electric current through the welding pieces and plates to be joined and applying pressure as and for the purpose described.

2. The method of joining metal plates or pieces edge to edge by their plane surfaces consisting in superposing on said plates a plurality of flat welding pieces along the line of proposed union and bridging the adjacent edges of the plates, passing an electric current through the welding pieces and plates to be joined and applying pressure thereto to unite said pieces to both said plates.

3. The method of joining metal plates edge to edge by their plane surfaces consisting in superposing on said plates a plurality of flat welding pieces along the line of proposed union and having a restricted area of contact with the surface of both plates on either side of the line of union, passing an electric current through the pieces and plates and applying pressure to unite the pieces to both plates.

4. The method of joining metal plates edge to edge consisting in superposing on said plates a plurality of flat, circular welding pieces bridging the line of the opposed edges, passing an electric current through the welding pieces and plates and applying pressure as and for the purpose described.

5. The method of joining metal plates or pieces edge to edge by their plane surfaces, consisting in superposing on said plates a separate welding piece bridging the adjacent edges of the plates and provided with curved edges where said piece engages the plates or pieces to be joined so as to engage the latter by a limited area of contact and welding said pieces together by the application of electric current and pressure applied transversely as and for the purpose described.

Signed at N. Y. city in the county of New York and State of New York this 23d day of March A. D. 1912.

LAURENCE S. LACHMAN.

Witnesses:
HENRY D. BARMORE,
F. B. TOWNSEND.